Nov. 10, 1953
G. RAUGLAS
2,658,777
LOCKING DEVICE
Filed May 5, 1949
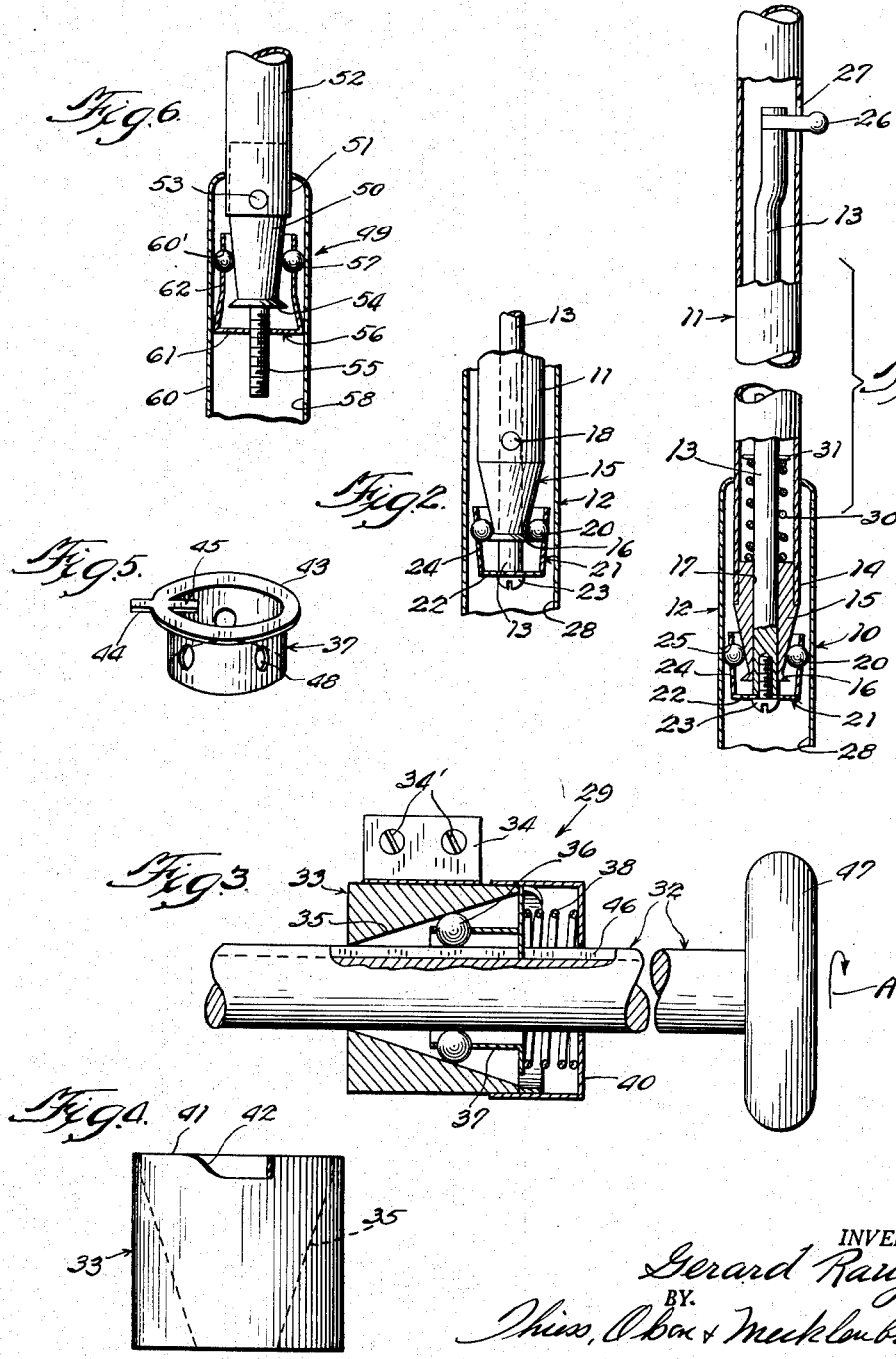

Patented Nov. 10, 1953

2,658,777

UNITED STATES PATENT OFFICE 2,658,777

LOCKING DEVICE

Gerard Rauglas, Mineola, Fla.

Application May 5, 1949, Serial No. 91,543

2 Claims. (Cl. 287—58)

1

This invention relates to a device for holding telescoping sections in an extended, non-retract- Various types of holding or locking devices for telescoping sections have heretofore been proable position.

posed which are either difficult to operate, become ineffective after repeated use, or have various parts of the device exposed whereby they may be readily damaged or knocked out of adjustment.

Thus it is one of the objects of this invention to provide a holding device for telescoping sections having the working parts thereof completely enclosed between the adjacent surfaces of said sections, and thereby insuring greater protection of the working parts from dirt or other foreign materials.

It is a further object of this invention to provide a holding device for telescoping sections having the working parts thereof adapted to be actuated into holding position upon relative movement of the sections in one direction and released from said holding position upon relative movement of the sections in the opposite direction.

It is a still further object of this invention to provide a holding device for telescoping sections having the working parts thereof completely invisible.

It is a still further object of this invention to provide a holding device for telescoping sections whose working parts cannot be accidentally knocked out of adjustment.

It is a still further object of this invention to provide a holding device which is simple and compact in construction, effective in operation, and inexpensive to produce.

Further and additional objects will appear from the description, accompanying drawings, and appended claims.

In accordance with one embodiment of this invention, a device is provided for holding telescoping sections in an extended, non-retractable position, comprising a plurality of elements placed between and tangentially engaging the adjacent surfaces of said sections. The adjacent surface of one of the telescoping sections is tapered. Also positioned between the adjacent surfaces of the sections is a seating member for retaining said elements in position. The seating member is adapted to move independently in a longitudinal direction relative to said sections upon relative movement of said sections in certain directions. The elements, upon relative movement of the sections in one direction, are

2 caused to wedge between the adjacent surfaces thereof by the seating member and hold the sections in an extended, non-retractable position. Upon relative movement of the sections in the opposite direction, the elements are released from the wedged position by the seating member.

For a more complete understanding of this invention, reference should now be had to the drawings wherein Figure 1 is a fragmentary, side-elevational view of one form of a holding device showing the telescoping sections in an extended, non-retractable position and having the outer telescoping section partially cut away to expose the working parts of said device.

Fig. 2 is similar to Fig. 1 but showing the device in its non-holding position.

Fig. 3 is a fragmentary, side-elevational view of a modified form of holding device showing the telescoping sections in a non-retractable position and the outer telescoping section partially cut away to expose the working parts of said device.

Fig. 4 is a side-elevational view of the outer telescoping section for the device shown in Fig. 3.

Fig. 5 is a perspective view of the seating member for the device shown in Fig. 3.

Fig. 6 is a fragmentary, side-elevational view of another modified form of holding device showing the telescoping sections in an extended, non-retractable position and the outer telescoping section partially cut away to expose the working parts of said device.

Referring now to the drawings and, more particularly, to Figs. 1 and 2, a device 10 is shown for holding telescoping sections 11 and 12 in various extended, non-retractable positions. The inner telescoping section 11 is of cylindrical construction and has coaxially mounted therein a push rod 13. The lower end of the rod 13 extends beyond the enclosed end 14 of the telescoping section 11.

Fitted into the enclosed end 14 of section 11 and held in place therein by rivet 18 is a conical-shaped guide and wedge member 15. The guide and wedge member 15 extends longitudinally from end 14 and has the exposed side portions thereof tapered. The narrow end of member 15 is provided with an annular shoulder 16. An opening 17 is provided in member 15 for enabling the end portion of rod 15 to extend therethrough. Member 15 centers rod 13 within section 11.

Surrounding member 15 and tangentially engaging the tapered side portions thereof are a plurality of metallic balls 20. The balls are retained in their symmetrical position about guide and wedge member 15 by means of a cup-shaped seating or ball race member 21. The base 22 of the seating member 21 is secured to the end of push rod 13 by means of a lock screw 23 which is axially centered and longitudinally threaded into the push rod 13, as seen in Fig. 1. The sides 24 of seating member 21 diverge slightly from the base 22 thereof and are disposed between the tapered side portions of member 15 and the adjacent surface 28 of telescoping section 12. A plurality of spaced openings 25 are provided in the sides 24 into which the balls 20 are loosely seated.

On the upper end of push rod 13 is transversely mounted a finger handle or grip 26. The handle 26 extends through an elongated, longitudinal slot 27 formed in the inner telescoping section 11. The finger handle 26 is adapted to be actuated in a downward direction by the operator resulting in the release of the balls 20 from the wedged or holding position and enabling telescoping section 11 to be retracted into telescoping section 12. The balls 20 are normally held in a wedged or holding position between the tapered sides of guide and wedge member 15 and the adjacent surface 28 of telescoping section 12 by seating or ball race member 21. The push rod 13 is actuated by coil spring 30 to cause seating member 21 to normally hold the balls 20 in this wedged position. The spring 30 embraces a portion of push rod 13 and has one end thereof engaging guide member 15 and the other end thereof engaging a pin 31 transversely mounted on rod 13. To release the balls 20 from their holding position, the operator presses down on the finger handle 26 compressing spring 30 and causing the push rod 13, seating member 21, and balls 20 to move independently in an endwise direction relative to guide and wedge member 15 and unwedge the balls, as seen in Fig. 2. The annular shoulder 16, formed at the narrow end of member 15, prevents the balls 20 from slipping out of the openings 25 provided in seating member 21 when the balls are in their non-holding position. With the balls so positioned, the operator may readily retract the telescoping sections any desired amount and, upon release of the finger handle 26, the balls will once again wedge between the sections and hold them in a non-retractable position.

The form of holding device shown in Figs. 1 and 2 is particularly adapted for use in adjustable microphone stands and the like, where the height thereof is frequently varied.

A modified form of holding device 29 is shown in Fig. 3 wherein the inner telescoping section 32 is a solid shaft and the outer telescoping section 33 is in the form of a bearing sleeve. The outer section 33 is rigidly secured to a suitable frame or support, not shown, by a bracket 34 and lock bolts or screws 34'. The bracket 34 is fastened by welding, or any other similar means, to the outer periphery of section 33. The inner periphery or surface 35 of section 33 is tapered to provide a wedging action as shown in Fig. 3.

Positioned between the adjacent surfaces of the telescoping sections 32 and 33 are a plurality of metallic balls 36 which are actuated into and out of a wedged position by seating or ball race member 37. The balls 36 tangentially engage tapered surface 35 and the outer periphery of shaft or section 32 when they are in their wedged position. Seating member 37 positively holds the balls 36 in their wedged position by means of a coil spring 38, which is positioned between and engages the seating member 37 and a cap 40 which is rigidly secured by welding, or any other suitable means, to the corresponding end of telescoping section 33. Cap 40 is provided with a suitable opening in its base to enable telescoping section 32 to extend therethrough.

Seating member 37, as shown in Fig. 5, is provided with a flanged collar 43, at one end thereof, and projecting radially therefrom, in an outward direction, is a studlike member 44. Extending radially inwardly from collar 43 of seating member 37 is another studlike member 45.

Studlike member 44 is adapted to slidably engage the edge 41 of section 33. Edge 41 is adjacent the diverging end of tapered surface 35 and has formed therein a slotted portion 42, as seen in Fig. 4. When studlike member 44 is positioned in slotted portion 42, the seating member 37 holds the balls 36 in their wedged position. Upon moving of studlike member 44 out of slotted portion 42, the seating member 37 is moved in a longitudinal direction toward the diverging end of section 33 and releases the balls 36 from their wedged or holding position.

Studlike member 45 engages a longitudinally-extending groove 46 formed in the outer periphery of shaft 32. On the end of shaft 32 is mounted handle 47. Upon the operator grasping the handle 47 and twisting in the direction A, the collar 37 is likewise rotated in direction A causing stud member 44 to be moved out of slotted portion 42. When the stud member 44 is moved out of slotted portion 42, the shaft 32 may be retracted into section 33.

A plurality of spaced openings 48 are formed in the side portions of the seating member 37 to enable the balls 36 to be rotatably seated therein.

Holding device 29 may be readily used in a various number of ways, for example, in combination with automobile emergency brake mechanisms. The actuating spring or cable of such a braking mechanism may be secured to the free end of shaft 32.

The advantages of holding device 29 in such an installation are: that the brake may be readily applied or released by the operator. Also, once the brake is applied, the holding device will remain in its operative position indefinitely regardless of the retracting force applied; that is to within the structural limits of the device.

As shown in Fig. 6, another modified form of holding device 49 is provided wherein a conically-shaped guide and wedge member 50 is mounted on the enclosed end 51 of the inner telescoping section 52 and held in place by means of a rivet 53. The guide and wedge member 50 extends longitudinally from the end 51 of section 52 and has its exposed side portions tapered. At the lower or narrow end of conically-shaped member 50 is formed an annular shoulder 54 whose function is the same as that of shoulder 16 for guide and wedge member 15, above described. Extending longitudinally from shoulder 54 is a threaded stud 55. Threadably mounted on stud 55 is a ferrule member 56 which is adapted to retain a plurality of balls 57 in a symmetrical position about the tapered portions of the member 50. When the balls 57 are moved into their wedged position, they tangentially engage the side portions of members 50 and the adjacent peripheral surface 58 of the outer telescoping section 60. The sides 62 of ferrule member 56 extend in substantially a perpendicular direction from the base 61 thereof and are positioned between guide and wedge member 50 and surface 58 of section 60. Openings 60' are provided in sides 62 to enable balls 57 to be seated therein.

Upon a relative twisting movement of the telescoping sections 52 and 60 in one direction, the stud 55 is threaded through ferrule member 56, the base 61 of which frictionally engages the adjacent surface 58 of section 60, causing balls 57 to wedge between member 50 and surface 58 of section 60. Upon a relative twisting movement of the telescoping sections 52 and 60 in the opposite direction, the stud 55 is threaded out of ferrule member 56 and the balls 57 are released from the wedged position and the sections retracted. The frictional engagement of ferrule member 56 on surface 58 of section 60 is only slight and does not interefere with the retracting or extending of the telescoping sections 52 and 60.

Holding device 49 is particularly adapted for use in adjustable tent or awning poles.

Thus, it will be seen that three forms of holding devices are shown which are readily adapted for various uses, only a few of which have been indicated. All the holding devices are enclosed between the telescoping sections and thereby are protected from damage caused by dirt or other foreign materials. The holding devices, by being concealed between the telescoping sections, do not derogate the outside appearance of the telescoping sections. The devices are likewise simple and compact in construction, effective in operation, even after extensive use, and inexpensive to produce.

While several embodiments of this invention are shown above, it will be understood, of course, that the invention is not to be limited thereto since many modifications may be made, and it is contemplated, therefore, by the appended claims, to cover any such modifications as fall within the true spirit and scope of this invention.

I claim:

1. A device of the class described comprising a pair of telescoping sections adapted to be normally held in a non-retractable, extended position, the outer telescoping section having the surface thereof adjacent the inner telescoping section tapered, and the edge of the outer section at the diverging end of the tapered surface deformed, a plurality of balls tangentially engaging the adjacent surfaces of said sections, a spring-actuated seating member disposed between said adjacent surfaces and adapted to normally hold said balls in a wedged postion, said member provided with a flanged collar and having a portion thereof adapted to slidably engage said deformed edge, and means for effecting longitudinal movement of said seating member relative to said tapered surface and release said balls from said wedged position upon a relative twisting movement of said sections.

2. A device of the class described comprising a pair of telescoping sections adapted to be normally held in a non-retractable, extended position, the outer telescoping section having a portion of its surface adjacent the inner telescoping section tapered and a deformed ledge provided at the diverging end of said tapered surface, a plurality of balls tangentially engaging the tapered surface of the outer section and the adjacent surface of said inner section, a seating member positioned between said tapered and adjacent surfaces and adapted to normally hold said balls in a wedged position, said member having an outwardly extending element adapted to slidably engage said ledge, and means for effecting longitudinal movement of said member relative to said tapered surface and thereby release said balls from said wedged position upon relative twisting movement of said sections; said means comprising a studlike member projecting inwardly from said seating member and engaging a longitudinally extending groove formed in the adjacent surface of said inner section.

GERARD RAUGLAS.

References Cited in the file of this patent

UNITED STATES PATENTS

| Number | Name | Date |
| --- | --- | --- |
| Re. 22,845 | Worthington | Feb. 18, 1947 |
| 1,075,323 | Benjamins | Oct. 4, 1913 |
| 1,194,551 | Schossler | Aug. 15, 1916 |
| 1,751,152 | Harter | Mar. 18, 1930 |
| 2,473,351 | Thompson et al. | June 14, 1949 |

FOREIGN PATENTS

| Number | Country | Date |
| --- | --- | --- |
| 87,614 | Switzerland | Feb. 16, 1921 |
| 472,608 | France | Aug. 11, 1914 |
| 513,733 | Great Britain | Oct. 20, 1939 |
| 592,023 | Germany | Jan. 31, 1934 |